Patented July 21, 1953

2,646,450

UNITED STATES PATENT OFFICE 2,646,450

PROCESS FOR MAKING UNSATURATED DIMERS OF ALPHA-ALKYL STYRENES

William S. Thurber, Midland, Mich., assignor to The Dow Chemical Company, Midland, Mich., a corporation of Delaware No Drawing. Application May 25, 1951, Serial No. 228,360

14 Claims. (Cl. 260—669)

This invention concerns an improved process for making the unsaturated dimers of alpha-alkyl styrenes. It relates more particularly to new catalyst materials for the preparation of unsaturated dimers from monomeric alpha-alkyl styrenes, e. g. alpha-methyl styrene.

Hershberger in United States Patent 2,429,719 has disclosed a method for making unsaturated dimers of alpha-alkyl styrenes by contacting monomers of an alpha-alkyl styrene, e. g. alpha-methyl styrene, with an aqueous solution of sulfuric acid as catalyst or condensing agent. According to the patent it is necessary to employ substantial amounts of the condensing agent, usually from 3 to 4 volumes, relative to the proportion of the alpha-alkyl styrene used, in order to obtain satisfactory results. The use of such large proportions of condensing agent relative to the reactants employed, greatly reduces the amount of product than can be obtained from a reactor of a given size so that the process is not entirely satisfactory for producing the unsaturated dimers of an alpha-alkyl styrene on a commercial scale.

It has now been found that an alpha-alkyl styrene such as alpha-methyl styrene, or para-methyl-alpha-methyl styrene, can readily be polymerized to form the corresponding unsaturated dimers by contacting monomers of the alpha-alkyl styrenes with a minor proportion, e. g. 5 per cent by weight or less, of a catalyst material which is a mixture composed essentially of a phosphorus oxyhalide and a small amount of a strong mineral acid. More specifically, it has been found that the unsaturated dimers of alpha-alkyl styrenes can readily be obtained in good yield by reacting two molecules of at least one alpha-alkyl styrene, preferably two molecules of the same alpha-alkyl styrene, with each other in the presence of a catalyst material comprising a phosphorus oxyhalide and a strong mineral acid.

The catalyst material is preferably a mixture of phosphorus oxychloride (POCl$_3$) or phosphorus oxybromide (POBr$_3$) and a strong mineral acid such as hydrochloric acid, hydrobromic acid, ortho-phosphoric acid, nitric acid, or sulfuric acid, or an aqueous solution of any of these acids, in amounts corresponding to from 80 to 98 per cent by weight of the phosphorus oxyhalide and from 20 to 2 per cent of the acid. Water alone, or a lower aliphatic monocarboxylic acid, e. g. acetic acid, may also be used in preparing the catalyst material.

Such mixtures of phosphorus oxychloride or phosphorus oxybromide, and water, an acid, or an aqueous solution of an acid, as just described, are effective catalyst materials for the polymerization of alpha-alkyl styrenes to form the corresponding unsaturated dimers in good yield.

Alpha-methyl styrene is the preferred alpha-alkyl styrene, although other alpha-alkyl styrenes such as para-methyl-alpha-methyl styrene, meta-methyl-alpha-methyl styrene, ar-di-methyl-alpha-methyl styrene, ar-3,4-dichloro-alpha-methyl styrene, ar-chloro-ar-methyl-alpha-methyl styrene, ortho-chloro-alpha-methyl styrene, para-chloro-alpha-methyl styrene, alpha-ethyl styrene, para-methyl-alpha-ethyl styrene, ortho-methyl-para-ethyl-alpha-methyl styrene, or para-isopropyl-alpha-methyl styrene, may be used. Mixtures of any two or more of such alpha-alkyl styrenes may also be used in the process.

The polymerization of alpha-alkyl styrenes to form the corresponding unsaturated dimers with the aid of a catalyst mixture composed principally of a phosphorus oxyhalide such as phosphorus oxychloride or phosphorus oxybromide and a minor amount of a strong mineral acid is usually carried out by mixing a small amount of the catalyst materials with the compound to be polymerized and thereafter maintaining or heating the mixture at a reaction temperature between 0° and 130° C., preferably from 10° to 80° C. and at atmospheric pressure, although higher pressures may be used.

The polymerization takes place with the liberation of much heat. Dissipation of the heat generated by the reaction and good temperature control may advantageously be obtained by carrying out the reaction in continuous manner and in the presence or absence of an inert liquid reaction medium, suitably an inert organic solvent such as benzene, toluene, carbon tetrachloride, Skellysolve, etc., although the reaction may satisfactorily be carried out batchwise and in the substantial absence of an inert reaction medium.

The catalyst material containing phosphorus oxychloride or phosphorus oxybromide and a strong mineral acid as the essential ingredients is usually employed in amount of from 0.05 to 5 per cent, preferably from 0.1 to 2 per cent, by weight of the monomeric alpha-alkyl styrene used. Somewhat greater proportions of the catalyst mixture may be used but are less satisfactory since a greater amount of the catalyst increases the tendency toward the formation of polymerization products other than the unsaturated dimers, e. g. the formation of higher polymerization products such as trimers and tetramers of the monomeric alpha-alkyl styrenes, together with the cyclic or saturated dimers.

The unsaturated dimers formed by reacting together two molecules of the same alpha-alkyl styrene in the presence of a catalyst mixture containing as the essential ingredients phosphorus oxychloride or phosphorus oxybromide and a strong mineral acid, usually consists of a mixture of the corresponding isomeric 1-pentene and 2-pentene derivatives. For instance, the unsaturated dimers of alpha-methyl styrene are the isomeric compounds 2,4-diphenyl-4-methyl-1-pentene and 2,4-diphenyl-4-methyl-2-pentene, respectively. The relative proportion in which the 1-pentene and 2-pentene isomeric derivatives are formed appears to be dependent for the most part upon the temperature at which the polymerization reaction is carried out. The polymerization reaction for the dimerization of alpha-methyl styrene tends toward the formation of the unsaturated compound 2,4-diphenyl-4-methyl-1-pentene as the major component of the unsaturated dimer product when the reaction is carried out at temperatures of from 0° to about 80° C. At higher temperatures, e. g. at reaction temperatures of from 90° to 130° C., the unsaturated dimer 2,4-diphenyl-4-methyl-2-pentene is usually formed in amount equal to, or greater than, the 1-pentene isomer derivative. At a reaction temperature within the range of from 0° to 130° C. and in the presence of a catalyst mixture comprising as the essential ingredients phosphorus oxychloride or phosphorus oxybromide and a strong mineral acid, the polymerization of an alpha-alkyl styrene, e. g. alpha-methyl styrene, occurs so as to form the unsaturated dimers as the principal product. The saturated cyclic dimer, if formed, is usually present in only small amount, e. g. in amounts of 15 per cent by weight or less of the reaction mixture.

It has also been found that the proportion of the isomeric unsaturated 1-pentene and 2-pentene derivatives relative to each other is not only dependent upon the temperature at which the reaction is carried out but is also dependent in part upon the reaction time under otherwise similar polymerization conditions. In general, a short reaction time, e. g. a reaction time of 3 minutes or less, at temperatures of about 80° C. or above, results in the formation of a dimeric product containing the isomeric 1-pentene derivative in major amount whereas a reaction time of from 20 to 30 minutes or longer forms the unsaturated 2-pentene derivative in major amount. Thus, by changing the temperature at which the polymerization is carried out, or by varying the reaction time, the process may readily be carried out so as to obtain a desired isomeric unsaturated dimer in predominant amount.

In practice, the alpha-alkyl styrene, preferably alpha-methyl styrene, is charged into a suitable reaction vessel provided with means for controlling the temperature such as a jacket or internal coils for passage of heating or cooling medium therethrough. The alpha-alkyl styrene is agitated and the desired proportion of a catalyst mixture, e. g. a mixture of 80 per cent by weight of phosphorus oxychloride and 20 per cent of ortho-phosphoric acid, is added thereto. Stirring of the mixture is usually continued over a period of from 0.5 to 6 hours or longer, although a greater or lesser reaction time may be used. The reaction time is dependent for the most part upon the temperature at which the reaction is carried out. Satisfactory results have been obtained by discontinuing the reaction, particularly in batchwise operation, upon cessation of the exothermic polymerization reaction. Best results are usually obtained by carrying out the reaction in continuous manner. Upon discontinuing the polymerization reaction the catalyst is removed or neutralized by washing the mixture with water, or an aqueous solution of an alkali, e. g. an aqueous 5 weight per cent solution of sodium hydroxide or potassium carbonate. The aqueous and organic layers are separated and the latter is distilled, preferably under reduced pressure to recover the dimeric product and separate it from the unreacted alpha-alkyl styrene and higher boiling polymerization products. The dimeric product is usually obtained as a mixture of the unsaturated isomeric 1-pentene and 2-pentene derivatives since the boiling points of the unsaturated dimers are so close to each other that they cannot readily be separated by a usual distillation.

The method herein described may be carried out batchwise or in continuous manner and in the presence or absence of an inert liquid organic compound as solvent or reaction medium. An alternative mode of procedure consists in concurrently feeding the catalyst and a monomeric alpha-alkyl styrene, preferably alpha-methyl styrene, into admixture with each other in a reaction vessel wherein the mixture is agitated and heated to the desired temperature. Simultaneous with the addition of the monomeric alpha-alkyl styrene and the catalyst mixture, the liquid polymerized material is drawn from the vessel and is washed with water to separate the catalyst. The aqueous and organic layers are separated. The organic layer is fractionally distilled under vacuum to recover the dimer product and separate it from unreacted monomeric alpha-alkyl styrene and higher boiling polymerization products of the alpha-alkyl styrene which may also be formed in the reaction. The reaction may advantageously be carried out in the presence of from 0.1 to 9 parts, preferably from 0.25 to 3 parts, by weight of a reaction medium consisting of an inert liquid organic compound such as aliphatic or aromatic hydrocarbons and halogenated derivatives thereof. Examples of suitable liquid organic compounds which may be used as reaction media are carbon tetrachloride, chloroform, ethylene dichloride, methylene chloride, propylene dichloride, ethylidene chloride, methylchloroform, nor.-butyl chloride, benzene, toluene, xylene, cyclohexane, methylcyclohexane, chlorobenzene, bromobenzene, orthodichlorobenzene, ethylbenzene, ethyltoluene, pentane, hexane, heptane and Skellysolve. The liquid organic compound employed as the reaction medium should preferably have a boiling point between 30° and 140° C. at atmospheric pressure for convenience in separating the solvent from the reaction product, although aliphatic and aromatic hydrocarbons and halogenated derivatives thereof, boiling at higher or lower temperatures may satisfactorily be used.

The following examples illustrate ways in which the principle of the invention has been applied, but are not to be construed as limiting the invention.

EXAMPLE 1

A charge of 500 grams of alpha-methyl styrene was placed in a reaction flask equipped with a reflux condenser and stirrer. It was stirred and 0.5 gram of a mixture consisting of 80 per cent by weight of phosphorus oxychloride (POCl₃) and 20 per cent of water, was added thereto as catalyst. The mixture was maintained at a temperature between 0° and 6° C. over a period of 6 hours. Thereafter, the mixture was washed with water and the oil layer separated. 470 grams of oil were obtained. It was fractionally distilled. There were obtained 196 grams of unreacted alpha-methyl styrene, 35 grams of an intermediate fraction, 145 grams of unsaturated dimers of alpha-methyl styrene and 94 grams of higer boiling liquid residue. The unsaturated dimer fraction was analyzed and found to contain 86.9 per cent by weight of 2,4-diphenyl-4-methyl-1-pentene, the remainder being principally 2,4-diphenyl-4-methyl-2-pentene.

EXAMPLE 2

A charge of 500 grams of alpha-methyl styrene was placed in a reaction vessel equipped with a reflux condenser and stirrer. It was stirred and 1 gram of a catalyst mixture consisting of 98 per cent by weight of phosphorus oxybromide (POBr$_3$) and 2 per cent of water, were added thereto. An exothermic reaction occurred. The temperature of the mixture increased from 23° to 110° C. over a period of 8 minutes. Stirring of the mixture was continued, without application of heating or cooling, over a period of 1 hour after addition of the catalyst. The mixture was removed from the flask, washed with water and the crude reaction product separated as an oil layer. 500 grams of crude product were obtained. It was fractionally distilled and found to consist of 53 grams of alpha-methyl styrene, 360 grams of unsaturated dimers of alpha-methyl styrene and 87 grams of higher boiling liquid residue. The dimer fraction was analyzed and found to be free of saturated compounds. It consisted principally of 2,4-diphenyl-4-methyl-2-pentene, the remainder being 2,4-diphenyl-4-methyl-1-pentene.

EXAMPLE 3

To a charge of 500 grams of alpha-methyl styrene at a temperature of 4° C. there was added with stirring, 2 grams of a mixture consisting of 80 per cent by weight of phosphorus oxybromide (POBr$_3$) and 20 per cent of syrupy phosphoric acid (H$_3$PO$_4$), as catalyst. The mixture was stirred over a period of about 4 hours, during which reaction time the temperature of the mixture increased from 4° to 72° C. The mixture was cooled, washed with water and the oil layer separated. There were obtained 496 grams of crude product. It was fractionally distilled and found to consist of 39 grams of monomeric alpha-methyl styrenes, 396 grams of alpha-methyl styrene dimers, boiling at 125°–131° C. at 2 millimeters absolute pressure and 61 grams of liquid higher boiling residue. The dimer fraction was analyzed and found to consist of 73.8 per cent by weight of 2,4-diphenyl-4-methyl-1-pentene and 26.2 per cent of 2,4-diphenyl-4-methyl-2-pentene.

EXAMPLE 4

A charge of 250 grams of alpha-methyl styrene was reacted over a period of 2 hours at temperatures of from 25° to 29° C. in the presence of 0.5 gram of a mixture consisting of 95 per cent by weight phosphorus oxychloride (POCl$_3$) and 5 per cent of syrupy phosphoric acid, by procedure similar to that described in Example 3. The crude product obtained by washing the mixture with water and separating the oil, weighed 245 grams. It was fractionally distilled. There were obtained 76 grams of unreacted alpha-methyl styrene, 119 grams of unsaturated dimers of alpha-methyl styrene and 50 grams of higher boiling liquid residue.

EXAMPLE 5

To a charge of 500 grams of alpha-methyl styrene there was added with stirring, a mixture consisting of 0.8 gram of phosphorus oxybromide and 0.2 gram of nitric acid, as catalyst. A vigorous reaction occurred. The temperature of the mixture increased from 27° to 130° C., over a period of 6 minutes. The mixture was stirred, without application of heating or cooling, for a total time of 2 hours after adding the catalyst. The crude product obtained by washing the mixture with water consisted of 450 grams of oil. It was fractionally distilled. There were obtained 23 grams of alpha-methyl styrene, 313 grams of unsaturated alpha-methyl styrene dimers and 114 grams of higher boiling liquid residue.

EXAMPLE 6

A mixture consisting of 0.8 gram of phosphorus oxybromide (POBr$_3$) and 0.2 gram of sulfuric acid was added as catalyst to 500 grams of alpha-methyl styrene while stirring the latter in a reaction flask equipped with a reflux condenser. The temperature of the reaction mixture increased from 27° to 68° C., over a period of 5 minutes. Stirring was continued, without application of heating or cooling, over a period of 2 hours after adding the catalyst to the alpha-methyl styrene monomers. The reaction mixture was then washed with water and the oil layer separated. 498 grams of oil were obtained. It was fractionally distilled and found to consist of 251 grams of alpha-methyl styrene, 174 grams of unsaturated dimers of alpha-methyl styrene and 73 grams of liquid higher boiling residue.

EXAMPLE 7

To a charge of 500 grams of alpha-methyl styrene there was added with stirring 1 gram of a mixture consisting of 80 per cent by weight of phosphorus oxybromide (POBr$_3$) and 20 per cent of a concentrated aqueous solution of hydrochloric acid. The mixture was heated to a temperature of 60° C. and the reaction continued for a total time of 6 hours. The mixture was removed from the flask, washed with water and the oil layer separated. There were obtained 487 grams of oil. It was fractionally distilled. There were obtained 84 grams of alpha-methyl styrene, 363 grams of unsaturated alpha-methyl styrene dimers and 40 grams of liquid residue.

EXAMPLE 8

A mixture consisting of 0.4 gram of phosphorus oxychloride (POCl$_3$) and 0.1 gram of syrupy phosphoric acid was added as catalyst to 350 grams of an isomeric mixture of ar-dimethyl alpha-methyl styrenes, while stirring the latter in a reaction flask equipped with a reflux condenser. The temperature of the mixture increased from 10° to 80° C. over a period of 23 minutes. Stirring of the reaction mixture, without application of heating or cooling, was continued for a period of 2 hours after adding the catalyst. The crude product obtained by washing the mixture with water was fractionally distilled. There were obtained 95 grams of unreacted monomers, 120 grams of the corresponding unsaturated dimers and 124 grams of higher boiling polymerization products.

EXAMPLE 9

A charge of 600 grams of 3,4-dichloro-alpha-methyl styrene was placed in a reaction flask equipped with a reflux condenser and stirrer. It was stirred and 0.75 gram of a mixture consisting of 80 per cent by weight of phosphorus oxychloride and 20 per cent of syrupy phosphoric acid, added thereto as catalyst, at a temperature of 4° C. The temperature of the mixture increased to 35° C. over a period of 3 hours. The mixture was then heated to a temperature of 110° C. for an additional 3 hour period. It was then cooled, washed with water and the oil layer separated. 590 grams of crude product were obtained. It was fractionally distilled. There were obtained 193 grams of unreacted 3,4-dichloro-alpha-methyl styrene, 300 grams of the unsaturated dimers of ar-dichloro-alpha-methyl styrene boiling at 198°–200° C. at 1 millimeter absolute pressure and 97 grams of higher boiling residue.

EXAMPLE 10

A charge of 70 pounds of alpha-methyl styrene was placed in a glass-lined reaction vessel equipped with a stirrer. It was stirred and 0.125 pound of a mixture consisting of 80 per cent by weight of phosphorus oxychloride ($POCl_3$) and 20 per cent of syrupy phosphoric acid, added thereto as catalyst. The temperature of the mixture increased from 25° C. to 115° C., over a period of 28 minutes. The mixture was stirred, without application of heating or cooling, over a period of 1.5 hours after addition of the catalyst. Thereafter, the mixture was washed with 80 pounds of water and the organic layer separated. There were obtained 68.4 pounds of crude product. It was fractionally distilled. There were obtained 43.4 pounds of unsaturated dimers of alpha-methyl styrene boiling at 140°–144° C., at 3–4 millimeters absolute pressure, together with 4.4 pounds of lower boiling ingredients and 20.6 pounds of higher boiling liquid residue. The unsaturated alpha-methyl styrene dimers were analyzed and found to contain 71.3 per cent by weight of 2,4-diphenyl-4-methyl-2-pentene, the remainder being 2,4-diphenyl-4-methyl-1-pentene.

EXAMPLE 11

A solution of 5.6 liters of alpha-methyl styrene and 2.4 liters of carbon tetrachloride was mixed with 8 cubic centimeters of a catalyst mixture consisting of 80 per cent by weight of phosphorus oxychloride and 20 per cent of ortho-phosphoric acid, by concurrently feeding the alpha-methyl styrene solution and the catalyst in continuous manner into a 2 liter glass reaction vessel equipped with a reflux condenser and stirrer, wherein the reaction mixture was stirred and heated to its reflux temperature (about 98° C.). Simultaneous with addition of the monomeric alpha-methyl styrene solution and the catalyst, the liquid polymerized material and reaction medium were continuously withdrawn from the reaction vessel at approximately the same rate as the feed of materials thereto and was immediately washed with water to separate the catalyst. The solution of alpha-methyl styrene and carbon tetrachloride was fed to the reaction vessel at a rate of two liters of the solution per hour. The catalyst was fed into admixture with the solution at a rate of two cubic centimeters of the catalyst per hour. The reaction time, i. e. the time required for an infinitesimal portion of the reaction mixture to pass through the reaction vessel from point of feed to point of discharge, was approximately 30 minutes. The reaction was continued over a period of 4 hours. Upon completion of the reaction and washing of the liquid product with water, the aqueous and organic layers were separated. The organic layer was distilled. The carbon tetrachloride was separated by heating the liquid product at atmospheric pressure. The remaining liquid was fractionally distilled under vacuum. There were obtained 1059 grams of unreacted alpha-methyl styrene, 3074.5 grams of a dimer fraction boiling at 120°–125° C. at 2 millimeters absolute pressure, and 908.5 grams of liquid higher boiling polymers of alpha-methyl styrene. The dimer fraction was a colorless liquid. It was analyzed and found to consist of 36 per cent by weight of 2,4-diphenyl-4-methyl-1-pentene, 57 per cent of 2,4-diphenyl-4-methyl-2-pentene and 7 per cent of 1,1,3-trimethyl-3-phenyl indan. The yield of unsaturated dimers was 72 per cent, based on the alpha-methyl styrene consumed in the reaction.

EXAMPLE 12

In each of a series of experiments, alpha-methyl styrene was reacted in continuous manner by procedure similar to that described in Example 11, except that the reaction was carried out in the presence of an inert liquid organic compound as reaction medium and at temperatures as stated in the following table. The alpha-methyl styrene was employed in amount corresponding to 30 parts by volume of the alpha-methyl styrene per 70 parts of the organic reaction medium. The rates of feed of the alpha-methyl styrene solution and the catalyst to the reaction vessel in each of the experiments was the same as that stated in the preceding example. Each experiment was continued over a period of three hours. Table I identifies each experiment by naming the organic compound employed as solvent and reaction medium and states the relative proportion in parts by volume of the solvent and the alpha-methyl styrene used in the reaction. The table gives the temperatures at which the reactions were carried out and the proportions in per cent by weight of the unreacted alpha-methyl styrene, the dimer fraction and the higher boiling polymers of alpha-methyl styrene in the reaction mixture. The table also gives the relative proportions in per cent by weight of 2,4-diphenyl-4-methyl-2-pentene, 2,4-diphenyl-4-methyl-1-pentene and 1,1,3-trimethyl-3-phenyl indan in the dimer fraction.

*Table I*

| Run No. | Reaction Medium | | Alpha-Methyl Styrene, Parts | Reaction Temp., °C. | Reaction Product | | | Composition of Dimer Fraction | | |
|---|---|---|---|---|---|---|---|---|---|---|
| | Kind | Parts | | | Percent Alpha-Methyl Styrene | Percent Dimer Fraction | Percent Higher Polymers | Percent 2-Pentene Derivative | Percent 1-Pentene Derivative | Percent Indan Derivative |
| 1 | Skellysolve, 60°–70° C. | 30 | 70 | 70–89 | 15 | 55 | 30 | 54 | 43 | 3 |
| 2 | Benzene | 30 | 70 | 78–105 | 12 | 64 | 24 | 54 | 37 | 9 |
| 3 | Ethylene Dichloride | 30 | 70 | 78–98 | 23.2 | 61.8 | 15 | 55 | 39 | 6 |

EXAMPLE 13

Approximately 500 grams of the unsaturated dimers of alpha-methyl styrene was placed in the reaction vessel described in Example 11. It was stirred and heated to a temperature of 41° C. and 14 pounds of monomeric alpha-methyl styrene and 4 cubic centimeters of a catalyst mixture consisting of 80 per cent by weight of phosphorus oxychloride and 20 per cent of ortho-phosphoric acid, were fed into the vessel at rates of 7 pounds of the alpha-methyl styrene and 2 cubic centimeters of the catalyst per hour, and at the same time liquid, polymerized alpha-methyl styrene was continuously withdrawn from the reaction vessel at approximately the same rate as the addition of the monomeric compound. The liquid reaction product withdrawn from the vessel was washed with water to separate the catalyst and the aqueous and organic layers were separated. A portion of the organic layer was fractionally distilled. It was found to contain 10.5 per cent by weight of unreacted alpha-methyl styrene, 44.8 per cent of dimers and 44.7 per cent of higher boiling polymers of alpha-methyl styrene. The dimer fraction was analyzed and found to consist of 47 per cent by weight of 2,4-diphenyl-4-methyl-1-pentene, 41 per cent of 2,4-diphenyl-4-methyl-2-pentene and 12 per cent of 1,1,3-trimethyl-3-phenyl indan.

EXAMPLE 14

A charge of 500 grams of methylene chloride and 0.5 gram of a catalyst mixture consisting of 80 per cent by weight of phosphorus oxychloride and 20 per cent of syrupy ortho-phosphoric acid was placed in a glass reaction flask equipped with a dropping funnel, a reflux condenser and stirrer. The mixture was stirred and maintained at a temperature of 30° C. while adding 500 grams of alpha-methyl styrene thereto over a period of two hours. Thereafter, the mixture was washed with water and the aqueous layer neutralized with sodium hydroxide solution to destroy the catalyst. The aqueous and organic layers were separated. The organic layer was distilled at atmospheric pressure to remove the solvent. There was obtained 500 grams of liquid residue. It was fractionally distilled under reduced pressure and found to consist of 14.7 per cent by weight of unreacted alpha-methyl styrene, 53.5 per cent of dimeric alpha-methyl styrene boiling at temperatures of from 120° to 138° C. at 2–2.5 millimeters absolute pressure, and 31.8 per cent of liquid higher boiling polymeric product. The dimeric alpha-methyl styrene fraction was analyzed and found to consist of 58 per cent by weight of 2,4-diphenyl-4-methyl-1-pentene, 41 per cent of 2,4-diphenyl-4-methyl-2-pentene and 1 per cent of the saturated dimer 1,1,3-trimethyl-3-phenyl indan.

EXAMPLE 15

In each of a series of experiments, a mixture of 500 cc. of alpha-methyl styrene and 500 cc. of carbon tetrachloride was placed in a glass reaction flask equipped with a reflux condenser and stirrer. The mixture was stirred and heated to reflux (about 80° C.). Thereafter, 0.5 gram of a catalyst material composed of a mixture of 80 per cent by weight of phosphorus oxychloride and 20 per cent of syrupy ortho-phosphoric acid, was added thereto. A vigorous reaction occurred. The reaction was continued for a period of time as stated in the following table. The reaction was discontinued by diluting the mixture with about twice its volume of water and the organic and aqueous layers were separated. The organic layer was distilled at atmospheric pressure to remove the carbon tetrachloride. The remaining liquid was fractionally distilled under vacuum to separate the dimeric product from unreacted alpha-methyl styrene and higher boiling polymeric products. Table II gives the proportions of alpha-methyl styrene and carbon tetrachloride in cubic centimeters and the weight in grams of the catalyst material used in each experiment. The table gives the temperatures at which the reaction was carried out and the reaction time in minutes. The table also gives the proportions in per cent by weight of the unreacted alpha-methyl styrene, the dimers and the higher polymeric products of alpha-methyl styrene in the reaction mixture, and the relative proportions of 2,4-diphenyl-4-methyl-2-pentene, 2,4-diphenyl-4-methyl-1-pentene and 1,1,3-trimethyl-3-phenyl indan in the dimer fraction.

*Table II*

| Run No. | Starting Materials | | | Polymerization Conditions | | Reaction Mixture | | | Composition of Dimer Fraction | | |
|---|---|---|---|---|---|---|---|---|---|---|---|
| | Alpha-Methyl Styrene, cc. | CCl4, cc. | Catalyst, Gm. | Temp., °C. | Time, Min. | Percent Alpha-Methyl Styrene | Percent Dimer Fraction | Percent Higher Polymers | Percent 2-Pentene Derivative | Percent 1-Pentene Derivative | Percent Indan Derivative |
| 1 | 500 | 500 | 0.5 | 81–87 | 1 | 70 | 26.6 | 3.4 | 14 | 76 | 10 |
| 2 | 500 | 500 | 0.5 | 81–86 | 5 | 34.3 | 54.5 | 11.2 | 55 | 36 | 9 |
| 3 | 500 | 500 | 0.5 | 81–86 | 15 | 17.3 | 67.5 | 15.2 | 50 | 39 | 11 |

This application is a continuation-in-part of my prior filed application, Serial No. 140,959, filed January 27, 1950, now abandoned.

Other modes of applying the principle of the invention may be employed instead of those explained, change being made as regards the steps or compounds herein employed, provided the steps or compounds stated in any of the following claims or the equivalent of such steps or compounds be employed.

I claim:

1. A process, for making the unsaturated dimers of an alpha-alkyl styrene, which comprises reacting together two molecules of at least one alpha-alkyl styrene at a temperature between 0° and 130° C. in the presence of from 0.05 to 5 per cent by weight of a catalyst mixture containing as the essential ingredients from 80 to 98 per cent by weight of a phosphorus oxyhalide selected from the group consisting of phosphorus oxychloride and phosphorus oxybromide, and from 20 to 2 per cent of a strong mineral acid and separating the unsaturated dimers from the reaction mixture.

2. A process, for making the unsaturated dimers of an alpha-alkyl styrene, which comprises reacting together two molecules of the same alpha-alkyl styrene at a temperature between 0° and 130° C. in the presence of from 0.05 to 5 per cent by weight of a catalyst mixture containing as the essential ingredients from 80 to 98 per cent by weight of a phosphorus oxyhalide selected from the group consisting of phosphorous oxychloride and phosphorous oxybromide, and from 20 to 2 per cent of a strong mineral acid and separating the unsaturated dimers from the reaction mixture.

3. A process, as described in claim 2, wherein the polymerization reaction is carried out in the presence of an inert liquid organic solvent.

4. A process, as described in claim 2, wherein the polymerization reaction is carried out in continuous manner and for a reaction time of less than 20 minutes.

5. A process, as described in claim 2, wherein the catalyst material is a mixture of from 80 to 98 per cent by weight of phosphorus oxychloride and from 20 to 2 per cent of ortho-phosphoric acid.

6. A process, for making the unsaturated dimers of an alpha-alkyl styrene which comprises reacting together two molecules of the same alpha-alkyl styrene at a temperature between 20° and 80° C. in the presence of from 0.1 to 2 per cent by weight of a catalyst mixture containing as the essential ingredients from 80 to 98 per cent by weight of a phosphorus oxyhalide selected from the group consisting of phosphorus oxychloride and phosphorus oxybromide, and from 20 to 2 per cent of a strong mineral acid and separating the unsaturated dimers from the reaction mixture.

7. A process, as described in claim 6, wherein the catalyst is a mixture consisting of from 80 to 95 per cent by weight of phosphorus oxychloride and from 20 to 5 per cent of nitric acid.

8. A process, as described in claim 6, wherein the catalyst is a mixture consisting of from 80 to 95 per cent by weight of phosphorus oxybromide and from 20 to 5 per cent of phosphoric acid.

9. A process as described in claim 6, wherein the catalyst is a mixture consisting of from 80 to 95 per cent by weight of phosphorus oxybromide and from 20 to 5 per cent of hydrochloric acid.

10. A process as described in claim 6, wherein the catalyst is a mixture consisting of from 80 to 98 per cent by weight of phosphorus oxychloride and from 20 to 2 per cent of ortho-phosphoric acid and the alpha-alkyl styrene is alpha-methyl styrene.

11. A process, as described in claim 6, wherein the catalyst is a mixture consisting of from 80 to 95 percent by weight of phosphorus oxybromide and from 20 to 5 per cent of phosphoric acid and the alpha-alkyl styrene is alpha-methyl styrene.

12. A process, for making the unsaturated dimers of an alpha-alkyl styrene, which comprises feeding a monomeric alpha-alkyl styrene and from 0.05 to 5 per cent by weight of a catalyst mixture containing as the essential ingredients from 80 to 98 per cent by weight of a phosphorus oxyhalide selected from the group consisting of phosphorus oxychloride and phosphorus oxybromide, and from 20 to 2 per cent by weight of a strong mineral acid, into admixture with each other in a reaction zone where the mixture is agitated and maintained at a reaction temperature between 0° and 130° C. for a reaction time of not more than 30 minutes, continuously withdrawing liquid polymerized alpha-alkyl styrene from said reaction zone, separating the unsaturated dimers from the reaction mixture and continuing feed of the monomeric alpha-alkyl styrene and catalyst to the reaction zone.

13. A process, as described in claim 12, wherein the reaction is carried out in the presence of an inert liquid organic solvent.

14. A process, as described in claim 12, wherein the alpha-alkyl styrene is alpha-methyl styrene.

WILLIAM S. THURBER.

References Cited in the file of this patent

UNITED STATES PATENTS

| Number | Name | Date |
|---|---|---|
| 2,490,372 | Nyquist et al. | Dec. 6, 1949 |
| 2,521,494 | Wiggins | Sept. 5, 1950 |
| 2,593,417 | D'Alelio | Apr. 22, 1952 |